(12) United States Patent
Kubodera et al.

(10) Patent No.: US 7,464,486 B2
(45) Date of Patent: Dec. 16, 2008

(54) METHOD AND DEVICE FOR DYEING LENSES

(75) Inventors: Takaaki Kubodera, Tokyo (JP); Masahiko Samukawa, Tokyo (JP)

(73) Assignee: Hoya Corporation, Tokyo (JP)

( * ) Notice: Subject to any disclaimer, the term of this patent is extended or adjusted under 35 U.S.C. 154(b) by 57 days.

(21) Appl. No.: 10/602,826

(22) Filed: Jun. 25, 2003

(65) Prior Publication Data
US 2004/0006835 A1 Jan. 15, 2004

(30) Foreign Application Priority Data
Jun. 26, 2002 (JP) .............................. 2002-185564

(51) Int. Cl.
*F26B 25/06* (2006.01)
(52) U.S. Cl. .............................. 34/202; 34/218; 34/227; 34/236; 432/77; 165/60
(58) Field of Classification Search ................... 34/202, 34/227, 218, 236; 432/77; 165/60; 8/506
See application file for complete search history.

(56) References Cited

U.S. PATENT DOCUMENTS

| | | | | |
|---|---|---|---|---|
| 3,920,463 A | * | 11/1975 | Simms | .......................... 501/13 |
| 4,036,624 A | * | 7/1977 | Krohn et al. | ................ 65/30.11 |
| 4,155,734 A | | 5/1979 | Krohn | |
| 4,160,655 A | * | 7/1979 | Kingsbury et al. | ......... 65/30.11 |
| 4,227,910 A | | 10/1980 | Deeg | |
| 4,259,406 A | * | 3/1981 | Borrelli | ....................... 428/410 |
| 4,290,794 A | * | 9/1981 | Wedding | .................... 65/30.11 |
| 5,096,457 A | | 3/1992 | Nakagawa et al. | |
| 5,340,399 A | | 8/1994 | Uftring et al. | |
| 5,560,751 A | | 10/1996 | Hoshiyama | |
| 6,129,042 A | | 10/2000 | Smith et al. | |
| 6,315,410 B1 | | 11/2001 | Doshi | |
| 6,520,999 B1 | * | 2/2003 | Kamata et al. | ................. 8/471 |

FOREIGN PATENT DOCUMENTS

| | | |
|---|---|---|
| FR | 2 436 113 | 9/1978 |
| JP | 8-20080 | 1/1996 |
| JP | 2000-314801 | 11/2000 |

OTHER PUBLICATIONS

European Search Report dated Jun. 17, 2004.

* cited by examiner

*Primary Examiner*—Jiping Lu
(74) *Attorney, Agent, or Firm*—Morrison & Foerster LLP

(57) ABSTRACT

In a method of coloring a dye coating-formed lens by heating, the lens is subjected to half dyeing by changing the heating temperature depending on the lens site. This dyeing method involves heating a lens having a dye coating-formed on the surface thereof in a heating furnace to diffuse a dye into the lens. This method is carried out in a heating furnace having a frame section having the shape of a cube or rectangular parallelepiped, a heating section provided within the frame section, and an insertion port for inserting the lens provided on the bottom surface of the frame section. All or a part of the lens is inserted from the insertion port into a furnace inside of the heating furnace from the lower portion of the heating furnace and heated.

6 Claims, 6 Drawing Sheets

METHOD AND DEVICE FOR DYEING LENSES

BACKGROUND OF THE INVENTION

1. Technical Field of the Invention

This invention relates to a method of dyeing a lens and a dyeing device, and more particularly, to a method and a device suitable for subjecting lenses to half dyeing.

2. Description of the Related Art

Known methods of dyeing lenses involve forming a dye coating on the surface of a lens and then heating to diffuse the dye into the lens. As examples of these methods, JP-A-8-20080 and JP-A-2000-314801 describe methods in which a dye coating is formed on the surface of a lens, and the resulting lens is placed on a doughnut-like jig that can be fixed around the lens, such that a convex surface of the lens is positioned downward, and heated in an oven to dye the lens.

SUMMARY OF THE INVENTION

Although, according to the methods described in these patent documents, it is possible to dye the entirety of a lens, these patent documents do not specifically propose a method of subjecting a lens to the half dyeing often employed for spectacle lenses to produce lenses whose coloring density changes.

This invention provides a solution for this problem, a method and device for dyeing a dye coating-formed lens by heating, in which the lens may be efficiently subjected to half dyeing. This solution may be achieved by using a heating furnace provided with an insertion port in a bottom section thereof which may be opened so that a lens may be inserted; setting the temperature within the heating furnace so that the temperature increases in the direction from the vicinity of the insertion port toward the inside of a frame section of the furnace; inserting a part or the whole of a dye coating-formed lens from the insertion port into the furnace inside of the heating furnace while holding the temperature distribution in that state; and heating the lens to produce the desired half-dyed lens.

Specifically, the invention includes a method for dyeing a lens that includes a coating formation step of forming a dye coating on the surface of a lens and a subsequent heating and diffusion step of heating the dye coating-formed lens to diffuse the dye into the lens. This method is preferably carried out in a heating furnace that has a frame section forming a space within the furnace, a heating section provided within the frame section, and an insertion port on or near the bottom surface of the frame section that may be opened for inserting the lens.

The method may also include a heating furnace temperature setting step that involves establishing a temperature distribution state within the heating furnace such that the temperature increases from the vicinity of the insertion port toward the inside of the frame section.

In this method, the heating and diffusion step may include a step in which all or a part of the dye coating-formed lens is inserted through the opened insertion port from the lower portion of the heating furnace into a furnace section inside of the heating furnace having the temperature distribution state set up therein, and thereafter heating the lens. In the heating and diffusion step of this method, all or a part of the dye coating-formed lens may be inserted from the insertion port from the furnace inside of the heating furnace, to heat the lens while moving it in a vertical direction.

The dyeing method of this invention may also include providing a heating furnace with a cooling mechanism in a position within the frame section corresponding to a portion of the lens not requiring coloration.

The device of this invention is adapted to perform the method of this invention (as well as other methods as desired) and includes a heating furnace having a frame section forming a space within the heating furnace, a heating section provided within the frame section, and an insertion port on or near the bottom surface of the frame section for inserting a lens into the heating furnace; a lens-holding mechanism for holding a dye coating-formed lens; and a lens-moving mechanism for moving the lens-holding mechanism to insert all or a part of the held lens from the insertion port into a furnace section inside the heating furnace. The heating furnace may further be provided with a cooling mechanism in a position within the frame section corresponding to a portion of the lens not requiring coloration. The lens-moving mechanism may also be provided with a controller for controlling the insertion position of the lens inside the furnace.

DETAILED DESCRIPTION OF THE INVENTION

Figure 1:
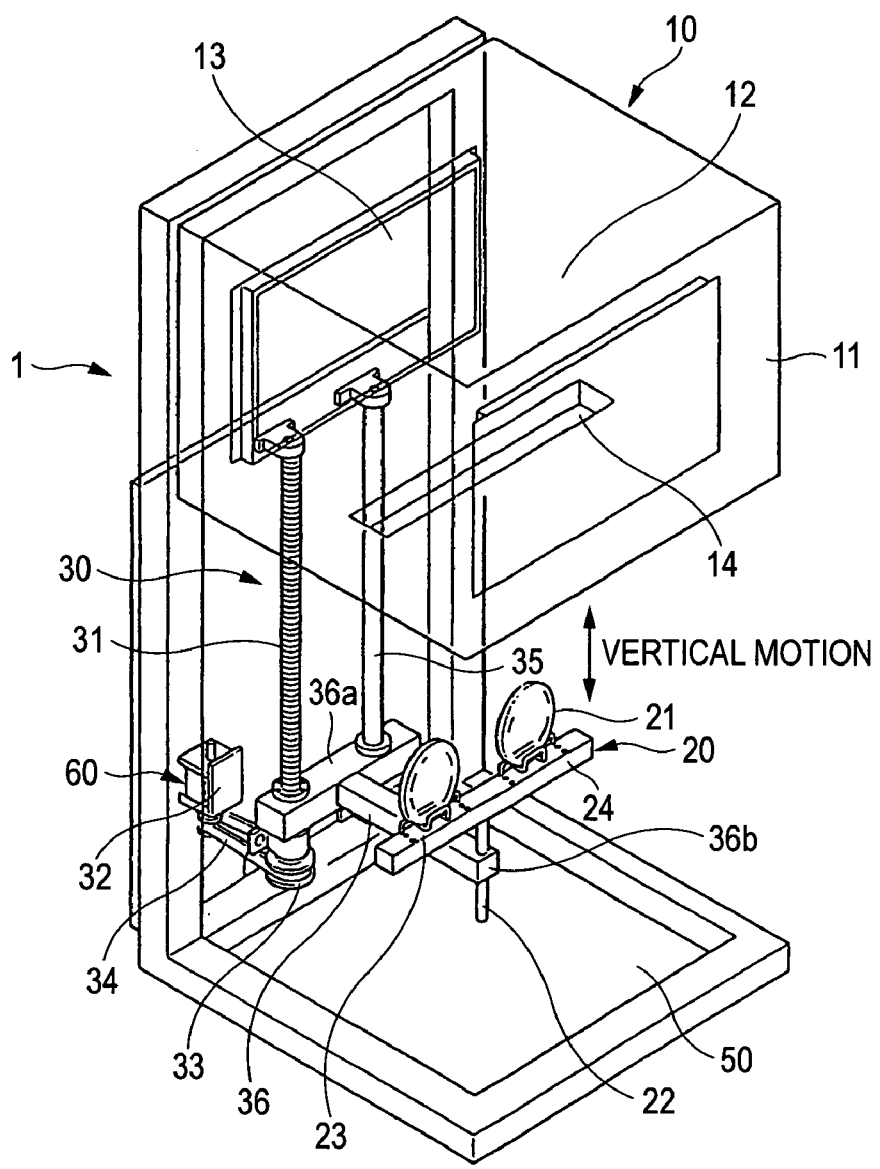
FIG. 1 is a perspective view showing one example of the dyeing device of this invention, showing a configuration of the device before insertion of a lens from a lens insertion port into a furnace portion inside the device.

In the method of this invention, the first step is a step of forming a dye coating on the surface of a lens. In this step, for example, the methods as disclosed in JP-A-8-20080 and JP-A-2000-314801 are employed. Specific examples of the method include methods in which a dyeing solution containing a disperse dye is prepared, and the dyeing solution is applied by brush coating, spin coating, ink jetting, etc. to the lens; and methods in which a dyeing solution containing a disperse dye and a water-soluble polymer is prepared, and the lens is immersed in the dyeing solution at room temperature.

Aqueous media are preferably used in the dyeing solution, since such media do not roughen the lens surface and are easier to work with than non-aqueous media.

Disperse dyes that have hitherto been used for coloring lenses are also preferably used as suitable dyes in the dyeing solution. Examples of such disperse dyes include Dianix Blue AC-E and Dianix Red AC-E, each of which is manufactured by DyStar Japan Ltd., and Kayalon Polyester Colours Yellow 4G-E and Kayalon Polyester Colours Scarlet 2R-E, each of which is a disperse dye manufactured by Nippon Kayaku Co., Ltd.

In the case where a water-soluble polymer is not added, the dye concentration is preferably 10% by weight or more, and particularly preferably 20% by weight or more based on the total weight of the dye solution, but is not limited thereto. In the case where a water-soluble polymer as described later is added, the dye concentration is usually selected from the range of from 0.1 to 20% by weight, and preferably from 3 to 10% by weight.

As in the methods disclosed in the above-cited JP-A-2000-314801, it is possible to add a water-soluble polymer to the dyeing solution. Examples of suitable water-soluble polymers include polyvinyl alcohol, polyacrylic acid, polyacrylic acid metal salts, polyacrylamide, polyvinylpyrrolidone, polyethylene glycol, and polyoxyethylene alkyl ethers. Of these are particularly preferable polyvinyl alcohol and polyethylene glycol because they are safety and inexpensive. These water-soluble polymers may be used singly or in combinations of two or more.

The water-soluble polymer increases the viscosity of the dyeing solution so that the dyeing solution adhered onto the lens surface is less likely to flow or run and so that, after the heat treatment, when the lens surface is washed with water, the residual disperse dye on the surface is easy to remove. Also, since the water-soluble polymer is poor in affinity with the disperse dye, it makes the disperse dye easily penetrate and diffuse into the inside of the lens upon heating.

It is advantageous to dissolve the water-soluble polymer in the aqueous medium before the addition of the disperse dye. Even though the disperse dye can be used in a state that it is not completely dissolved in the aqueous medium but may be partly suspended therein, it is necessary to use the water-soluble polymer in a state that it is completely dissolved in the aqueous medium, so it must be confirmed that the water-soluble polymer is dissolved as a colorless transparent aqueous solution. The amount of the water-soluble polymer to be dissolved is usually selected within the range of from 0.1 to 50 parts by weight, preferably from 1 to 10 parts by weight, based on 100 parts by weight of the total amount of the dye solution. Since the water-soluble polymer generally has a low dissolution rate in water, it must be completely dissolved by forced or long-term agitation. As the aqueous medium, water itself preferably is used. However, if desired, as long as the purpose of the invention is not hindered, it is also possible to use water to which is added an organic solvent that is miscible with water.

Instead of or in addition to the aforesaid water-soluble polymers, surfactants that are not usually considered to be water-soluble polymers can be added to the dyeing solution. A nonionic surfactant is preferable. In the case where the water-soluble polymer is not added, the addition amount of the surfactant is preferably from 1 to 30 parts by weight based on 100 parts by weight of the total amount of the dye solution. In the case where the water-soluble polymer is added, the amount of surfactant added is preferably from 5 to 20 parts by weight based on 100 parts by weight of the total amount of the dye solution.

The lenses to which the dyeing method of this invention may be applied include all forms of optical plastic lenses, including contact lenses, spectacle lenses, camera lenses, projector lenses, telescope lenses, and magnifying lenses. Particularly suitable among these lenses for use in this invention are lenses for visual acuity correction such as contact lenses and spectacle lenses, such as lenses made of polydiethylene glycol bisallyl carbonate, methyl methacrylate homopolymers, copolymers of methyl methacrylate and at least one other monomer, polycarbonate, polystyrene, polyethylene terephthalate, polyurethane, polythiourethane, or other sulfur-containing polymers.

The temperature of the dyeing solution during the formation of the dye coating is preferably a temperature at which the dye does not diffuse into the lens substrate so that the degree of coloration of the lens may readily be controlled, as discussed further below.

The lens on the surface of which is formed a dye coating with the dyeing solution by the method as described above is then subjected to the heating and diffusion step to diffuse the dye into the lens upon heating to dye the lens. The method of the invention preferably employs in the heating and diffusion step a heating furnace having a frame section forming a space within the heating furnace, a heating section provided within the frame section, and an insertion port on or near the bottom surface of the frame section that may be opened to allow for inserting the lens. The heating furnace temperature setting step sets up a temperature distribution state within the heating furnace such that the temperature increases from the vicinity of the insertion port toward the inside of the frame section, and the heating and diffusion step is carried out by inserting a part or the whole of the dye coating-formed lens from the insertion port at or near the lower end of the heating furnace into a furnace portion inside of the heating furnace having the necessary temperature distribution state set up therein and heating the lens so as to dye it.

After completion of the heating, the residual dye coating can be removed by washing with water or a conventional lens cleaning solution.

Next, the dyeing device that may be used in the method of the invention will be described with reference to the drawings.

FIG. 1 depicts device 1, which is basically constructed of a heating furnace 10, a lens-holding mechanism 20, and a lens-moving mechanism 30, which are supported by a supporting stand 50. The heating furnace 10 has a frame section 11 which forms a space within heating furnace 10 and a heater 13 provided on the side surface of the frame section 11. The furnace interior portion 12 forms a space for heating a dye coating-formed lens. Further, on the bottom surface of the frame section 11, a lens insertion port 14 for inserting the lens is provided in an open state. Lens insertion port 14 does not have to be exactly on the bottom surface of the frame section 11 but must be far enough down the frame section 11 so that the temperature distribution or gradient within the furnace is steep enough to allow for half dyeing of the lens inserted into the heating furnace, as explained below. The shape of the frame section is not limited to a rectangular parallelepiped as shown in FIG. 1 but may be a cube or other shape.

In the invention, it is preferable that in the heating furnace 1, the lens insertion port 14 is provided on or near the bottom surface of the frame section 11. In the practice of the method and device of this invention, air heated by the heater 13 moves upward within the furnace interior 12. Further, since in the furnace interior 12, only the lens insertion port 14 positioned in the lower portion is opened, and other openings are sealed, the temperature in the vicinity of the lens insertion port 14 is relatively low, and the temperature increases toward the inside of the furnace.

In the invention, the lens is heated and subjected to half dyeing by setting up a temperature distribution in the furnace interior 12 in the heating furnace temperature setting step.

Figure 2:
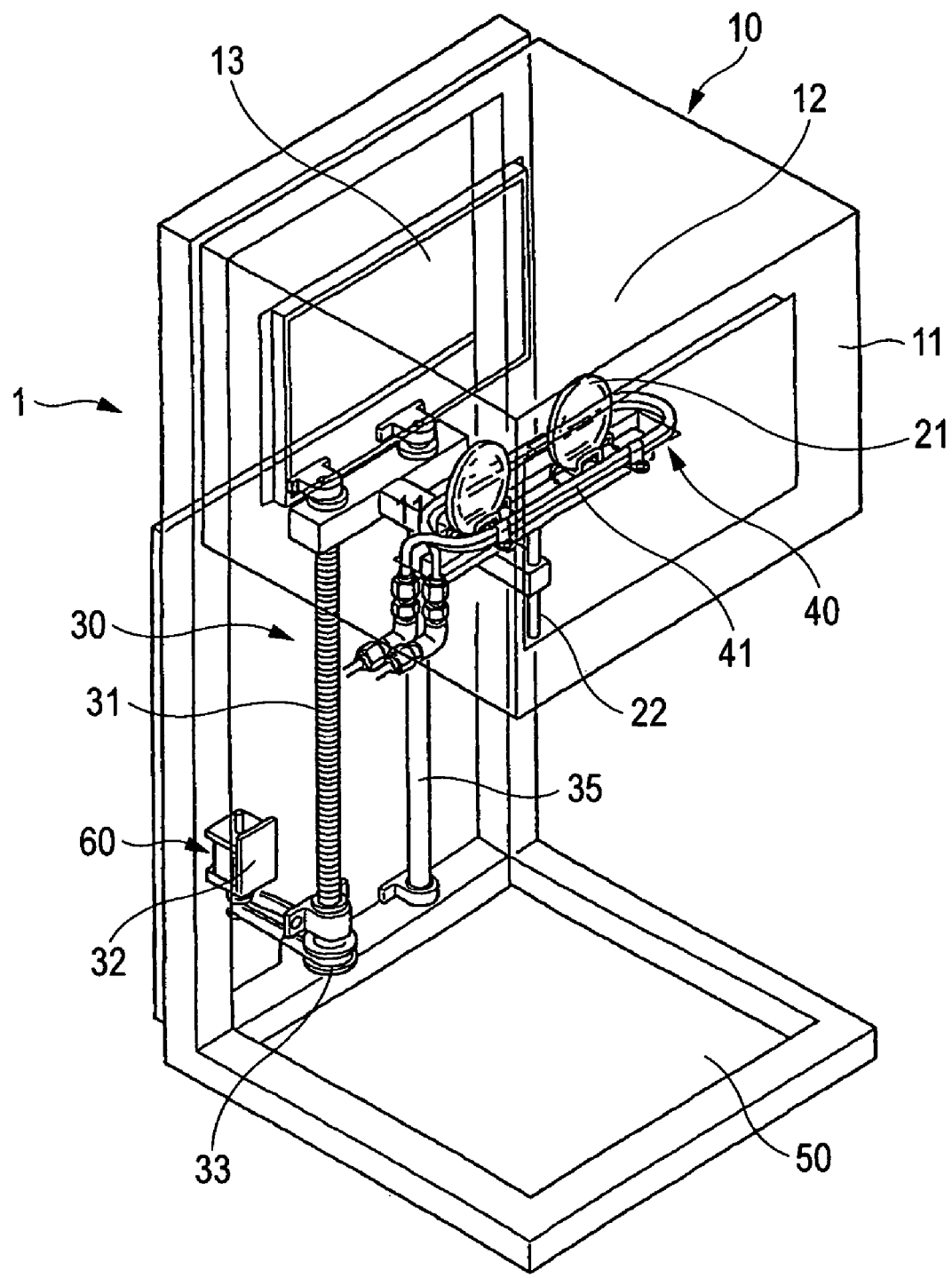
FIG. 2 is a perspective view of the dyeing device as shown in FIG. 1, showing a configuration of the device after the lens is inserted from the lens insertion port into the furnace portion inside the device.

FIG. 2 shows the method and apparatus of this invention after the lens is inserted from the lens insertion port into the furnace interior. When a dye coating-formed lens 21 is inserted from the lens insertion port 14 into the furnace interior 12, the temperature of the furnace interior 12 increases in an upward direction from the location where the lens is held. Accordingly, the tip of the lens away from the portion where the lens is held (the upper portion in the drawing) is heated most, and the heating temperature becomes low toward the portion where the lens is held (the lower portion in the drawing). Thus, the tip of the lens away from the portion where the lens is held is colored most deeply, and the coloration of the lens becomes paler as one proceeds downwardly across the lens.

In the case where the lens has a portion where no coloration is necessary, a cooling mechanism is provided in a position corresponding to the portion of the lens within the frame section not requiring coloration.

Figure 3:
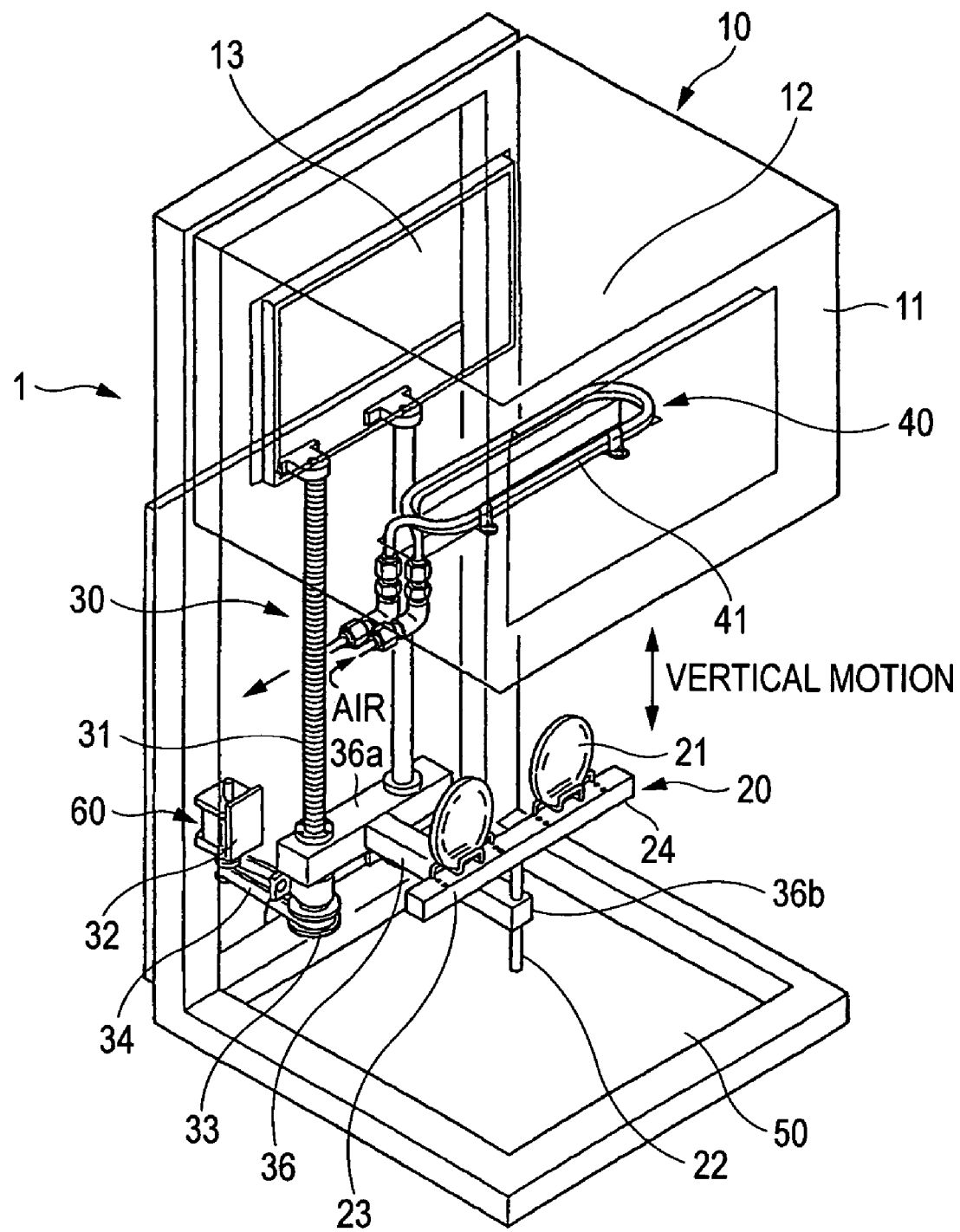
FIG. 3 is a perspective view of another example of the dyeing device of this invention, in which the dyeing device as shown in the configuration of FIG. 1 is further provided with a cooling mechanism.
Figure 4:
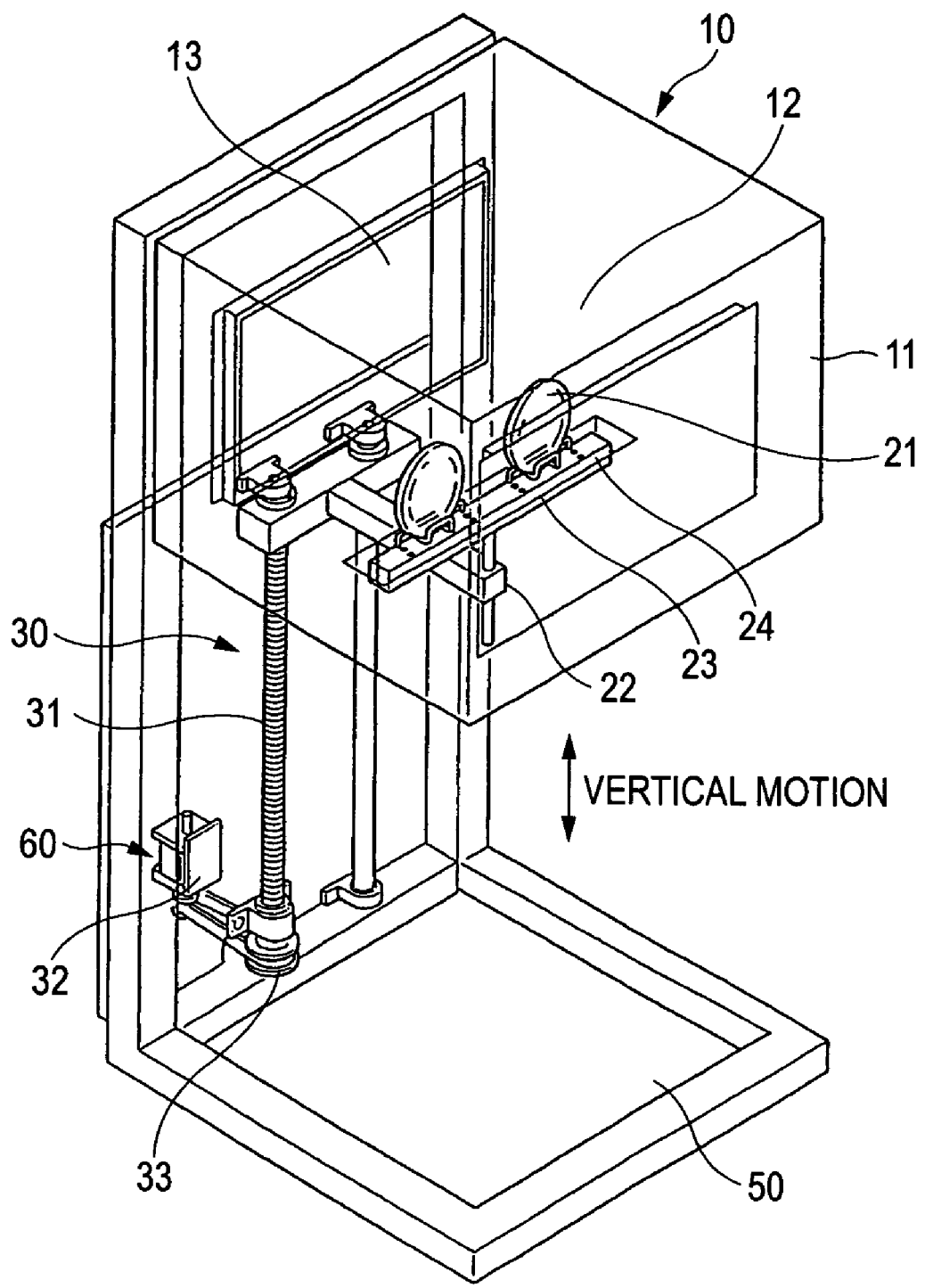
FIG. 4 is a perspective view of the dyeing device as shown in FIG. 3, showing a configuration in which the lens has been inserted from the lens insertion port into the furnace portion inside the device.

FIGS. 3 and 4 are perspective views of the dyeing device of FIG. 1 which is further provided with this cooling mechanism. These figures show cooling mechanism 40 formed from an oval cooling pipe 41 provided near the lens insertion port 14 of the furnace interior 12. This cooling mechanism has a structure in which a cooling medium such as water or air is circulated within the cooling pipe 41 and cools the corresponding portion of the lens 21 such that it is not colored. The material constituting the cooling pipe 41 is not particularly limited, but a material having good heat conductivity, such as copper, is preferably used.

The temperature of the furnace interior 12 is likewise not particularly limited, but, taking into consideration the coloration speed and heat resistance of the lens, is preferably in the range of from 90 to 150° C. The choice of temperature is well within the ability of a person skilled in this art to determine. In order to detect and control the temperature of the furnace interior 12, a thermometer can be provided in an arbitrary position.

The lens-holding mechanism 20 is basically constructed of a horizontal member 24 for holding the lower ends of the two lenses 21 such that the lenses 21 can be inserted into the lens insertion port 14; a shaft section 22 extending in the vertical direction of the central position on the bottom surface of the horizontal member 24; and lens-holding tools 23 each provided on the upper surface of the horizontal member for the purpose of holding the lens. The shaft section 22 and a moving member 36 of the lens-moving mechanism 30 are detachable from each other.

Incidentally, in order to make the furnace interior 12 have a proper temperature distribution, it is preferred that a part of the lens insertion port 14 be open even when the lens-holding mechanism 20 is moved to insert a part or the whole of the lens into the furnace interior 12, and it is preferred to regulate the size of the horizontal member 24 and the size of the lens insertion port 14. The position on the bottom surface on which the lens insertion port 14 is provided is not particularly limited, as long as the temperature of the furnace interior 12 increases from the vicinity of the lens insertion port toward the upper portion of the furnace interior 12. Further, the shape of the lens insertion port is not particularly limited so far as the lens can be inserted and the foregoing temperature distribution attained.

The lens-moving mechanism 30 is provided for vertically moving the lens between the setting position of the lens as shown in FIGS. 1 and 3 and the setting position of the lens in the furnace interior 12 of the heating furnace 10 as shown in FIGS. 2 and 4. The lens-moving mechanism 30 is basically constructed of a T-shaped moving member 36 to support the shaft section 22 of the lens-holding mechanism 20; two shafts 31 and 35 for moving the moving member 36 vertically; a pulse motor 32; a pulley 33; and a belt 34.

In the T-shaped moving member 36, holes for screw engagement and engagement with the shafts 31 and 35 are provided on a member 36a in parallel with the horizontal member 24 of the lens-holding tools 23, and a hole for holding the lens-holding tools 23 is provided on a member 36b perpendicular to the horizontal member 24 of the lens-holding tools 23. The shafts 31 and 35 are provided in the direction of the heating furnace 10 from the supporting stand such that the lenses 21 can move into the furnace interior 12 of the heating furnace 10.

Of the two shafts, one shaft 31 is provided with screw threads around its periphery. The member 36a of the moving member 36 is provided with a screw hole so that it may be screw engaged with the screwed shaft 31. The shaft 31 is provided with the pulley 33 in the lower end thereof and connected to the pulse motor 32 via the belt 34. Of the two shafts, the other shaft 35 is not provided with any screw thread. In this construction, when the pulse motor 32 is driven, it is possible to move the lenses 21 vertically. In addition, when a control section 60 is connected to the pulse motor 32, it is possible to control the height position of the lens 21 by elapsed time, if desired.

The supporting stand 50 is provided for the purpose of supporting the heating furnace 10, the lens-holding mechanism 20, and the lens-moving mechanism 30.

Figure 5:
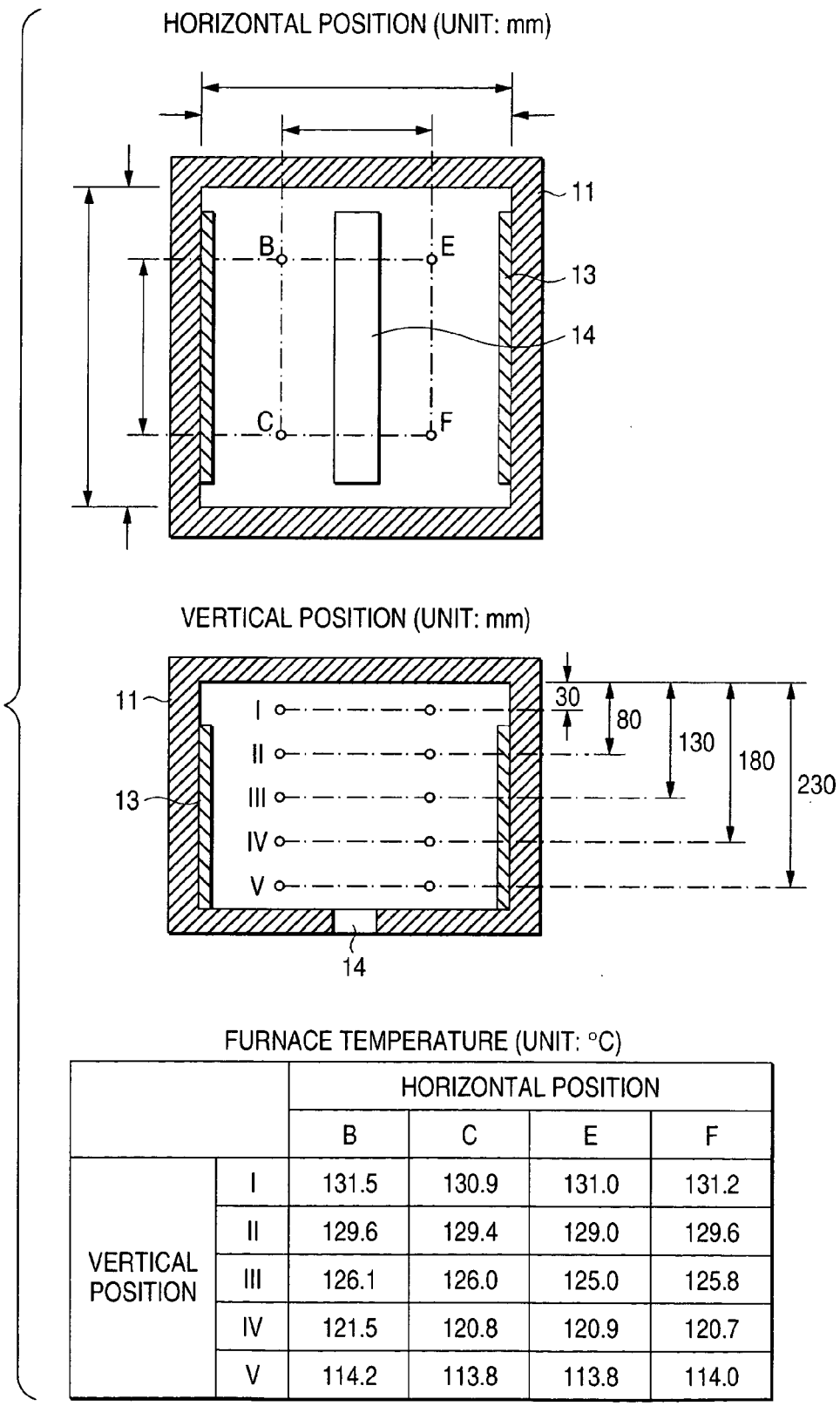
FIG. 5 is a chart with explanatory views of measurement points showing the temperature distribution when the temperature within the furnace is set at 130° C. in the configuration shown in FIG. 3.

FIG. 5 shows an exemplary temperature distribution in a furnace interior of the dimensions 33 by 36 by 26 centimeters when the setting temperature is 130° C. in the device and the device is configured as shown in FIG. 3. FIG. 5 shows the positions of the temperature measurements and the temperature at each of the positions.

As shown in FIG. 5, with respect to the temperature distribution of the furnace interior 12, the temperature in the vicinity of the lens insertion port is relatively lower, and the temperature becomes higher as one proceeds inward. With respect to the lens as inserted, the tip of the lens away from the portion where the lens is held is high, and the temperature becomes lower toward the position where the lens is held. From this observation, it can be confirmed that the temperature distribution is suitable for half dyeing of lenses.

Next, the invention will be described below in more detail with reference to the following non-limiting Example:

EXAMPLE 1

A dyeing solution at room temperature, made of 70% by weight of pure water, 20% by weight of dyes [Sumikaron Orange SE-RPD (trade name; sold by Sumitomo Chemical Co., Ltd.), Diacelliton Fast Yellow GL (trade name; sold by DyStar Japan Ltd.), Dianix Blue AC-E (trade name; sold by DyStar Japan Ltd.), and Disperse Red 802 (trade name; sold by Futaba Sangyo Co., Ltd.)], and 10% by weight of a water-soluble polymer [polyoxyethylene alkyl ether (trade name: NIKKOL BT-7, manufactured by Nihon Surfactant Kogyo K.K.)], was applied to an Eyry (trade name for a sulfur containing polymer, manufactured by Hoya Corporation; refractive index: 1.71, diameter: 80 mmϕ) substrate to obtain a dye coating-formed lens.

This lens was heated and dyed by the dyeing device as shown in FIGS. 1 and 2. First, the lens was held by the lens-holding mechanism, moved by the lens-moving mechanism, inserted from the lens inserting port into the furnace interior 12 having the temperature distribution as shown in FIG. 5 at a setting temperature of 130° C., and dyed upon heating for 60 minutes.

Figure 6:
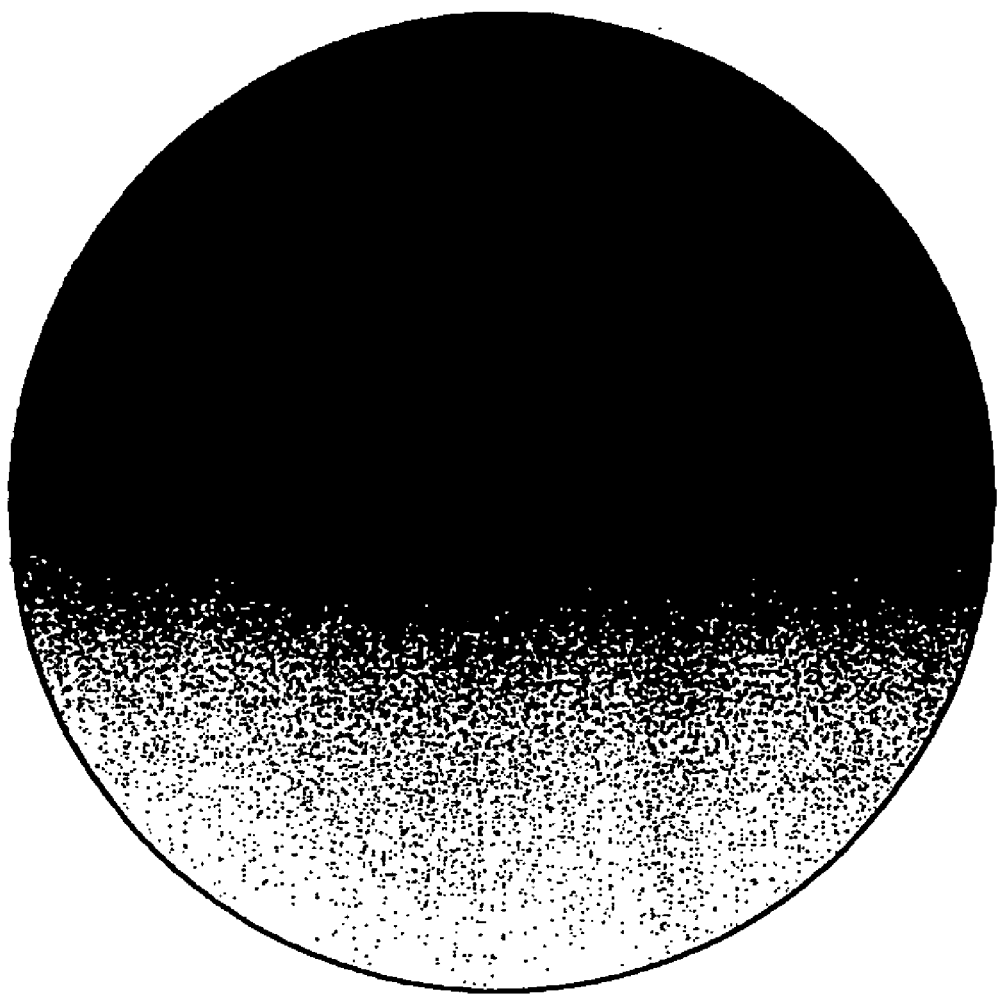
FIG. 6 is a perspective view of a half-dyed lens colored by the method and device of this invention.

As a result, there was obtained a deeply colored lens of half coloration as shown in FIG. 6 (the color density gradually deepens in the upward direction). Incidentally, in this Example, the lens was colored without using the foregoing cooling device.

Comparative Example 1

A lens was colored using the same dyeing solution as in Example 1 in the conventionally known method, i.e., a method of half dyeing by immersing the Eyry substrate in the dyeing solution heated at 90° C. As a result, even after the passage of 5 hours, the same colored lens could not be obtained.

Although preferred embodiments of the invention have been described herein, it will be understood by those skilled in the art that variations may be made thereto without departing from the spirit of the invention or the scope of the appended claims.

What is claimed is:

1. A dyeing device for dyeing a plastic lens, comprising:
 a heating furnace comprising a frame section forming a space within the heating furnace and a cooling mechanism in a position corresponding to a portion of the lens within the space formed by the frame section; wherein the cooling mechanism is separated from the frame section;
 a heating section provided within the frame section;
 an openable insertion port for allowing insertion of the lens provided on or near a bottom surface of the frame section;
 a lens-holding mechanism for holding the lens; and
 a lens-moving mechanism for vertically moving the lens-holding mechanism to insert all or a part of the lens from the insertion port into an interior portion of the heating furnace, wherein
 wherein the cooling mechanism is formed from a cooling pipe provided near the insertion port of the interior portion of the heating furnace.

2. The dyeing device for dyeing a plastic lens of claim 1, wherein the lens-moving mechanism further comprises a device for controlling the insertion position of the lens into the interior portion of the furnace.

3. The dyeing device for dyeing a plastic lens of claim 1, further comprising a device for controlling a temperature distribution within the heating section so as to produce a half-dyed lens.

4. The dyeing device for dyeing a plastic lens of claim 1, further comprising a device for controlling the heating of the lens so as to produce a variation in coloration in the lens.

5. A dyeing device for dyeing a plastic lens, comprising:
 a heating furnace comprising a frame section forming a space within the heating furnace;
 a heating section provided within the frame section;
 an openable insertion port for allowing insertion of the lens provided on or near a bottom surface of the frame section;
 a lens-holding mechanism for holding the lens; and
 a lens-moving mechanism for moving the lens-holding mechanism to insert all or a part of the lens from the insertion port into an interior portion of the heating furnace,
 wherein the lens-moving mechanism is configured to move the lens in a vertical direction while the lens is in the heating section, and
 wherein the heating furnace further comprises a cooling mechanism in a position corresponding to a portion of the lens within the frame section not requiring coloration, wherein
 wherein the cooling mechanism is formed from a cooling pipe provided near the insertion port of the interior portion of the heating furnace.

6. A dyeing device for dyeing a plastic lens, comprising:
 a heating furnace comprising a frame section forming a space within the heating furnace;
 a heating section provided within the frame section;
 an openable insertion port for allowing insertion of the lens provided on or near a bottom surface of the frame section;
 a lens-holding mechanism for holding the lens;
 a lens-moving mechanism for moving the lens-holding mechanism to insert all or a part of the lens from the insertion port into an interior portion of the heating furnace; and
 a device for setting a temperature distribution state within the heating furnace such that the temperature increases from the vicinity of the insertion port toward the inside of the frame section,
 wherein the heating furnace further comprises a cooling mechanism in a position corresponding to a portion of the lens within the frame section not requiring coloration, wherein
 wherein the cooling mechanism is formed from a cooling pipe provided near the insertion port of the interior portion of the heating furnace.

* * * * *